(12) United States Patent
Backman

(10) Patent No.: US 8,363,600 B2
(45) Date of Patent: Jan. 29, 2013

(54) OPTIMIZED MOBILE INTERNET ACCESS

(75) Inventor: Jan Backman, Kärna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 335 days.

(21) Appl. No.: 12/810,563

(22) PCT Filed: Dec. 31, 2007

(86) PCT No.: PCT/SE2007/001178
§ 371 (c)(1),
(2), (4) Date: Jun. 25, 2010

(87) PCT Pub. No.: WO2009/084989
PCT Pub. Date: Jul. 9, 2009

(65) Prior Publication Data
US 2010/0290402 A1 Nov. 18, 2010

(51) Int. Cl.
*H04W 4/00* (2009.01)
(52) U.S. Cl. .......... 370/328; 370/338; 709/241
(58) Field of Classification Search .......... None
See application file for complete search history.

(56) References Cited

U.S. PATENT DOCUMENTS

| | | | | |
|---|---|---|---|---|
| 7,085,579 B2 * | 8/2006 | Mizutani et al. | | 455/512 |
| 7,188,179 B1 * | 3/2007 | Hanson et al. | | 709/227 |
| 7,295,511 B2 * | 11/2007 | Sharma et al. | | 370/217 |
| 7,327,762 B2 * | 2/2008 | Lee | | 370/474 |
| 7,426,195 B2 * | 9/2008 | Mukherjee et al. | | 370/328 |
| 7,570,617 B2 * | 8/2009 | Kil et al. | | 370/331 |
| 7,633,898 B2 * | 12/2009 | Jain et al. | | 370/328 |
| 7,835,328 B2 * | 11/2010 | Stephens et al. | | 370/338 |
| 2002/0173310 A1 * | 11/2002 | Ebata et al. | | 455/445 |
| 2003/0224756 A1 | 12/2003 | O'Neill et al. | | |
| 2004/0008630 A1 | 1/2004 | Corson et al. | | |
| 2004/0047322 A1 * | 3/2004 | O'Neill | | 370/338 |
| 2004/0215389 A1 * | 10/2004 | Hirose | | 701/209 |
| 2004/0266393 A1 * | 12/2004 | Zhao et al. | | 455/407 |
| 2005/0228874 A1 * | 10/2005 | Edgett et al. | | 709/220 |
| 2005/0237969 A1 * | 10/2005 | Jung et al. | | 370/328 |
| 2005/0254475 A1 * | 11/2005 | Kubler et al. | | 370/338 |
| 2006/0045129 A1 * | 3/2006 | Hart et al. | | 370/468 |
| 2007/0230402 A1 * | 10/2007 | Kim et al. | | 370/331 |
| 2007/0253359 A1 | 11/2007 | Hall et al. | | |
| 2008/0037560 A1 * | 2/2008 | Jia et al. | | 370/400 |
| 2008/0092182 A1 * | 4/2008 | Conant | | 725/109 |
| 2008/0305792 A1 * | 12/2008 | Khetawat et al. | | 455/435.1 |
| 2009/0158148 A1 * | 6/2009 | Vellanki et al. | | 715/700 |
| 2010/0268583 A1 * | 10/2010 | Backman | | 705/14.4 |

(Continued)

FOREIGN PATENT DOCUMENTS

WO WO 2006/137037 A1 12/2006
WO WO 2008/027504 A2 3/2008

OTHER PUBLICATIONS

Jonsson, A. et al. Requirements on Mobile IP from a Cellular Perspective. Mobile IP Working Group. Jun. 1999.

(Continued)

*Primary Examiner* — Bunjob Jaroenchonwanit

(57) ABSTRACT

The present invention is directed to a method and a mobile node and a node arrangement for performing the method, which method is for selecting a connection (224, 314, 316) for a mobile node (310) arranged to operatively communicate with a network node arrangement (312) via a plurality of connections (224, 314, 316).

14 Claims, 4 Drawing Sheets

U.S. PATENT DOCUMENTS

2010/0299452 A1* 11/2010 Flammer et al. .............. 709/241
2011/0122844 A1* 5/2011 Harper et al. ................. 370/331

OTHER PUBLICATIONS

Bhagavathula, R. et al. Issues with Nested Mobility. Vehicular Technology Conference 2003. VTC 2003-Fall. 2003 IEEE 58$^{th}$. vol. 3 Oct. 6-9, 2003.
Levkowetz, H. et al. Mobile IP NAT/NAPT Traversal Using UDP Tunnelling. Internet Engineering Task Force Internet-Draft, May 2002.
Perkins, C. et al. Mobile IPv4 Challenge/Response Extensions (Revised). Network Working Group. RFC 4721. Jan. 2007.
Perkins, C. IP Mobility Support for IPv4. Network Working Group. RFC 3344. Aug. 2002.
Montenegro, G. Reverse Tunneling for Mobile IP, revised, Network Working Group. RFC 3024. Jan. 2001.
Johnson, D. et al. IP Mobility Support in IPv6. Network Working Group. RFC 3775, Jun. 2004.
Simpson, W. The Point-to-Point Protocol (PPP). Network Working Group. RFC 1661. Jul. 1994.
IEEE 802.11. IEEE Standard for Information technology—Telecommunications and information exchange between systems—Local and metropolitan area networks—Specific requirements. Part 11: Wireless LAN Medium Access Control (MAC) and Physical Layer (PHY) Specifications, IEEE Computer Society. IEEE Std 802.11—2007. Jun. 12, 2007.
IEEE 802.16. IEEE Standard for Local and Metropolitan Area Networks. Part 16: Air Interface for Fixed Broadband Wireless Access Systems. IEEE Computer Society, IEEE Std 802.16—2004. Oct. 1, 2004.
IEEE 802.3 IEEE Standard for Information technology—Telecommunications and information exchange between systems—Local and metropolitan area networks—Specific requirements. Part 3: Carrier Sense Multiple Access with Collision Detection (CSMA/CD) Access Method and Physical Layer Specifications. IEEE Computer Society. IEEE Std 802.3—2002. Mar. 8, 2002.

\* cited by examiner

OPTIMIZED MOBILE INTERNET ACCESS

TECHNICAL FIELD

The invention described herein relates to communication between nodes in communication networks. Embodiments of the invention relate to management of network addresses for mobile nodes in communication networks. Particular embodiment of the invention relate to nodes in wireless networks.

BACKGROUND OF THE INVENTION

Mobility in connection with communication networks is often a precondition. The ability to move within a network and/or between various networks is particularly desirable in connection with mobile wireless terminals, e.g. such as cell phones or such as laptops etc provided with WLAN functionality or similar. A similar mobility is often desired for other terminals, e.g. such as wired Personal Computers (PCs) or similar terminals or nodes that can be perceived as mobile or at least as substantially mobile depending on the particular installation etc.

As is well known to those skilled in the art, a solution for providing mobility in connection with the Internet and similar networks has been provided by the Internet Engineering Task Force (IETF). To this end the IETF has standardized a communication protocol called Mobile IP, or simply MIP. Mobile IP allows mobile devices to move from one network to another while maintaining a permanent IP-address. The basic features of Mobile IP are e.g. described in the IETF specification RFC 3344. Updates are e.g. described in IETF specification RFC 4721 and further developments are e.g. described in the specification RFC 3775.

Mobile IP provides an efficient and scalable mechanism for roaming within the Internet and similar networks. Through the use of Mobile IP a node may change its point-of-attachment to the network without changing its IP-address. This allows the node to maintain transport and higher-layer connections while moving between networks. Mobile IP is most often found in wired and wireless environments where users need to carry their mobile devices (Mobile Nodes) across multiple networks that are reached on different IP-addresses. Mobile IP may for example be used in roaming between overlapping wireless systems, for example between WiFi, WiMax and/or 3G telecommunication networks and similar.

FIG. 1 is a schematic illustration of an exemplifying and well known Mobile IP system 100, e.g. based on the IETF specification RFC 3344. As can be seen in FIG. 1 the system 100 comprises a Mobile Node 110, a Home Agent 112, a Foreign Agent 122 and a Correspondent Node 120. Various designs of the Mobile Node 110 (MN), the Home Agent 112 (HA), the Foreign Agent 122 (FA) and the Correspondent Node 120 (CN) are well known per se to those skilled in the art and there is no need for a detailed description. Nevertheless, short background will be provided below.

As can be seen in FIG. 1 the MN 110 is arranged to operatively communicate with the HA 112 or the FA 122 via the home network 114 or the foreign network 124 respectively. In turn, the HA 112 and the FA 122 are arranged to communicate with each other via a communication network 130 (e.g. the Internet or similar). In addition, the HA 112 is arranged to operatively communicate with the CN 120 via said communication network 130. In particularly, the HA 112 and the FA 122 are arranged to operatively enable communication between the MN 110 and the CN 120 over the network 130, irrespective whether the MN is connected to the home network 112 or the foreign network 124.

The exemplifying MN 110 in FIG. 1 may be a terminal, a host or a router or similar that changes its point of attachment from one network or sub-network to another without changing its IP-address with respect to nodes that may communicate with the MN 110, e.g. such as the CN 120. In this way the MN 110 can continue to communicate with other Internet nodes and similar at any location using its (constant) IP-address. Here, it is assumed that a link-layer connectivity to a point of attachment is available and that the MN 110 comprises suitable hardware and software, e.g. in the form of a interface that is suitable for utilizing the available link-layer connectivity, and a client that enables the MN 110 to access the network in question and nodes or similar that are available therein as is well known to those skilled in the art.

The exemplifying HA 112 in FIG. 1 may be a router or similar connected to the home network 114 of the MN 110. The HA 112 serves as the anchor point for communication with the MN 110. In particular, the HA 112 tunnels data packets or similar for delivery to the MN 110 when the MN 110 is away from its home network 114. In the exemplifying system 100 shown in FIG. 1 the HA 112 tunnels packets received from the CN 120 and addressed to the MN 110 at its Home Address (HoA), by forwarding the packets to a Care-of-Address (CoA) via a tunnel 132 established between the HA 112 and the FA 122, which is the reachable point for the MN 110 in the foreign network 124. Such tunneling is well known to those skilled in the art.

The exemplifying FA 122 in FIG. 1 is preferably a router or similar that operates as the point of attachment for the MN 110 when the MN 110 roams to the foreign network 124. In other words, the FA 122 is preferably a router in the foreign network 124 visited by the MN 110, which router provides mobility services to the MN 110 while registered. The FA 122 de-tunnels and delivers the data packets to the MN 110 that were tunneled by the HA 112 of the MN 110.

The CN 120 may be a peer or similar with which the MN 110 is communicating. The CN 120 may be mobile or stationary.

The following steps provide an exemplifying outline of the discovery and registration phase of the Mobile IP protocol in the exemplifying Mobile IP system 100 shown in FIG. 1.

a) The mobility agents (i.e. the FA 122 and the HA 112 enabling mobility for the MN 110) advertise their presence to the MN 110. As is well known, this can e.g. be done by means of Agent Advertisement messages or similar, which e.g. may comprise at least one Care-of-Address (CoA) and a flag indicating whether the mobility agent is a Home Agent or a Foreign Agent.

b) The MN 110 receives at least one of these advertisements and determines whether it is located on its home network 114 or on the foreign network 124.

c) If the MN 110 detects that it is located on the home network 114 it may operate without mobility services. If returning to its home network 114 from being registered elsewhere, the MN 110 deregisters with its HA 112 through the exchange of Registration Request and Registration Reply messages or similar as is well known.

d) If the MN 110 detects that it has moved to the foreign network 124 it registers with the FA 122 by sending a Registration Request message or similar, which includes the permanent IP-address (the HoA) for the MN 110 and the IP-address for the HA 112 of the MN 110. In turn, the FA 122 performs the registration process on behalf of the MN 110 by sending a Registration Request or similar containing the permanent IP-address for the MN 110 and the IP-address (the CoA) for the FA 122 to the HA 112. As indicated above, the CoA can be provided by the FA 122 in its advertisement messages (i.e. a foreign agent CoA) or by some external assignment mechanism such as DHCP or similar. The transportation of the MN 110 to the foreign network 124 is illustrated in FIG. 1 by a MN 110 with dashed lines at the home network 114 and a dashed arrow to the MN 110 with solid lines at the foreign network 124.

e) When the HA 112 receives the Registration Request message or similar from the FA 122 it updates its home list or similar by associating the CoA of the MN 110 with the HoA of the MN 110.

f) The HA 112 then sends an acknowledgement to the FA 122.

g) The FA 122 in turn updates its visitor list or similar by associating the HoA and/or the address for the HA 112 of the MN 110 with a media address for the MN 110 valid on the foreign network 124 and relays the reply to the MN 110.

The following steps provide an exemplifying outline of the service phase of the Mobile IP protocol in the exemplifying Mobile IP system 100 shown in FIG. 1.

1. When the CN 120 wants to communicate with the MN 110, it sends an IP packet addressed to the permanent IP-address (the HoA) of the MN 110.
2. The HA 112 then intercepts the packet and consults its home list or similar to find out whether the MN 110 is currently visiting any other network, e.g. finds out whether there is a CoA registered for the MN 110.
3. Assuming that the HA 112 encounters a CoA registered for the MN 110 it will construct a new IP header that contains the CoA of the MN 110 as the destination IP-address. The original IP packet comprising the HoA of the MN 110 is put into the payload of this IP packet. The HA 112 will then send a down-link packet to the CoA. This process of encapsulating one IP packet into the payload of another IP packet is known as IP-within-IP encapsulation, or tunneling. This has been illustrated in FIG. 1 by a tunnel 132 extending from the HA 112 to the FA 122.
4. When the encapsulated packet reaches the foreign network 124, the FA 122 decapsulates the packet and finds out the HoA of the MN 110. The FA 122 then consults its visitor list or similar to see if it has an entry for the MN 110.
5. If there is an entry for the MN 110 in the visitor list, the FA 122 retrieves the corresponding media address and relays the packet to the MN 110 via the foreign network 124.
6. When the MN 110 wants to send an up-link packet to the CN 120, it forwards the packet to the FA 122, which in turn relays the packet to the CN 120 using normal IP routing.

If needed, the MN 110 and the FA 122 can employ a so-called reverse tunnel in the up-link by tunneling packets from the MN 110 to the HA 112, which in turn forwards them to the CN 120. This is illustrated in FIG. 1 by a reverse tunnel 132' extending from the FA 122 to the HA 112.

Reverse tunneling is well known to those skilled in the art and the IETF specification RFC 3024 gives an illustrative example. Reverse tunnelling can e.g. be requested by the MN 110 in a registration request or similar sent to the FA 122 when accessing the foreign network 124. The FA 122 will then update its visitor list or similar, including an indication that the MN 110 has been granted a reverse tunnel. In turn, the HA 112 receiving a registration request or similar from the MN 110 via the FA 122 will update its home list or similar, including an indication that the MN 110 has been granted a reverse tunnel. Incoming traffic from the MN 110 sent to the CN 120 will then be tunnelled by the FA 122 to the HA 112 using the CoA as the address of sender (i.e. at this stage the HoA of the MN 110 is capsulated and not use as the address of sender). Incoming traffic from the FA 122 will then be decapsulated by the HA 112, which recovers the original packet and forwards it to the CN 120 on behalf of the MN 110 (i.e. at this stage the HoA of the MN 110 and not the CoA of the FA 122 is use as the address of sender).

The use of reverse tunneling reduces the risk for so-called spoofing. To elaborate the concept of spoofing it can be noticed that the header of each IP packet contains, among other things, the numerical source and destination address of a packet. The source address is normally the address of sender. By forging the header so that it contains a different IP-address, an attacker can make it appear that the packet was sent by another sender. The receiver that receives spoofed packets will send response back to the forged IP-address. In some cases it may e.g. be possible for the attacker to see or redirect the response to his own machine.

The principles of reverse tunneling as indicated above in an exemplifying manner apply mutatis mutandis to a foreign agent (FA) that is co-located with the MN 110 (co-located FA). An example of a co-located foreign agent (FA) will be described below with reference to FIG. 2

In contrast to the exemplifying network in FIG. 1, other networks may not have an explicitly designated FA or similar. Instead an Access Router (AR) or similar may be used for providing access for a mobile node to the network in question.

FIG. 2 is a schematic illustration of another exemplifying and well known Mobile IP system 200. The system 200 in FIG. 2 is substantially the same as the system 100 in FIG. 1. Hence, the same or similar reference numbers indicate the same or similar features. However, as can be seen in FIG. 2 the FA 122 in FIG. 1 has been replaced by an access router AR 222. Here, the foreign agent (FA) or similar can be perceived as located in the MN 210 (A co-located FA). Moreover, the tunnel 132 in FIG. 1 has been replaced by the tunnel 232 extending all the way to the MN 210 in FIG. 2. The fact that the MN 210 serves as the endpoint of the tunnel 232 is illustrated in that the tunnel 232 continues from the AR 222 to the MN 210 (e.g. to the FA co-located in the MN 210), instead of ending at the FA 122 as in FIG. 1. In the reverse direction, a reverse tunnel can be established in the same manner as previously described with reference to the reverse tunnel 132' in FIG. 1. However, as is well known to those skilled in the art, a reverse tunnel in the system 200 will extend from the MN 210 and its co-located FA all the way to the HA 112. Hence, in the system 200 the FA or similar being co-located with the MN 110 performs the same or similar tasks as the FA 122 in system 100 previously described with reference to FIG. 1.

The structure and function of the Mobile IP systems 100, 200 are well known to those skilled in the art and they are e.g. described in the IETF specification RFC 3344 and its ancillary specifications and in similar documents from the IETF and others. Hence, there is no need for a more detailed description of the general and well known structure and function of the Mobile IP systems 100, 200. However, specific details associated with embodiments of the present invention related to Mobile IP and similar will be discussed later herein.

As described above, it is assumed that the MNs 110, 210 in the systems 100, 200 respectively have the well known Mobile IP capability to signal its location to the Home Agent 112 so as to maintain a permanent IP-address while the MNs 110, 210 move from one network to another. In other words, i.e. the MNs 110, 210 maintains a permanent IP-address with respect to the CN 120 or similar nodes that may communicate with the MN 110, 210.

From the above it can be deducted that the MN 110, 210 located in a foreign network 124, 224 will always establish a downlink tunnel 132, 232 to be used by the HA 112 when forwarding packets from the CN 120 to MN 110, 210 via the FA 122 or similar. In addition, to reduce the risk for spoofing attacks etc, it is frequently preferred that the MN 110, 210 located at a foreign network 124, 224 establishes a reverse tunnel 132' to be used by the HA 112 when forwarding packets from the MN 110, 210 to the CN 120 via the FA 122 or similar.

However, tunnelling (e.g. an IP-within-IP encapsulation) of the aforementioned kind or similar will always involve tunnelling-overhead, e.g. encapsulation and decapsulation requiring extra processing and the transmission of additional headers etc. Overhead in the form of additional headers etc is particularly disadvantageous with respect to the scarce resources available when communicating over an air interface, which frequently is the case for the communication between the MN 110 and the home network 114, and the communication between the MN 110 and the foreign network 124, 224.

In addition, it frequently happens that the MN 110, 210 has access to the HA 112 via both the foreign network 124, 224 and the home network 114. This may e.g. be the case if the home network 114 is a local network (e.g. a hot spot) and the foreign network 124, 224 is a regional or global network at least covering parts of the home network 114. Known solutions provide no mechanism for avoiding tunnelling so as to optimize the routing path for the communication between a Mobile Node (MN) and a Home Agent (HA). Indeed, known solutions provide none or insufficient optimizing of the routing path for the communication between a Mobile Node (MN) and a Home Agent (HA) where several routing paths are available—including tunnelling and no tunnelling on a single connection as well as tunnelling or no tunnelling on several different connections.

Hence, it would be beneficiary to provide a solution wherein tunnelling can be avoided or only used if it is necessary. In particular, if both tunnelling and no-tunnelling can be used simultaneously it would be beneficiary to be able to select the most favourable alternative.

More generally, it would be beneficiary to be able to select the most favourable routing alternative in the up-link and in the down-link.

SUMMARY OF THE INVENTION

Embodiments of the invention are based on the observation that the connection between a MN and its HA may be a point-to-point connection. In general, a point-to-point connection is a communication link with two endpoints, wherein a packet or similar sent from one endpoint will always reach the other endpoint. Hence, in case of a point-to-point connection the HA and the MN has substantially direct access to each other. It follows that down-link packets or similar sent by the HA to the MN via a point-to-point connection will always reach the MN, and up-link packets or similar sent by the MN to the HA via a point-to-point connection will always reach the HA. In other words, entities and/or activities associated with or comprised by a point-to-point connection will not prevent packets or similar from being delivered to the endpoint, e.g. there is typically no Network Address Translation (NAT) or similar associated with at point-to-point connection. Indeed, packets or similar sent via a point-to-point connection will typically reach the endpoint regardless of the IP-address used by the sender. This is particularly clear in case of a simple wired point-to-point connection, but it is equally applicable for more complex wireless point-to-point connections.

Since packets sent over a point-to-point connection reach the destination regardless of the IP-address used, it follows that there is no need for the HA to tunnel down-link packets transmitted to the MN. Naturally, the same applies for the MN, which does not have to encapsulate and tunnel up-link packets sent to the HA. This is particularly so since a point-to-point connection usually makes spoofing etc impossible or at least very difficult.

Consequently, embodiments of the invention will not apply tunnelling if the connection between the MN and its HA is a point-to-point connection or similar. As the observant reader realises, this avoids unnecessary tunnelling-overhead. By avoiding tunnelling it follows that the most favourable alternative is selected in case tunnelling or no-tunnelling can be used simultaneously or alternatively on one or several connections.

In addition, embodiments of the invention are based on the observation that the HA can enable the MN to select a favourable routing path by providing the MN with information about the connections available between the MN and the HA. The HA may e.g. provide the MN with the information that a certain connection is a point-to-point connection, which implies that the MN should select an un-tunnelled up-link in favour of a tunnelled up-link to the HA in case both alternatives are available for the MN on the connection, since the tunnelled alternative is associated with a higher routing cost. More general, the HA can enable the MN to select a favourable routing path by providing the MN with information about the routing costs for the connections available between the MN and the HA, where the routing cost is extended to include further parameters in addition to possible information about the point-to-point character of a certain connection.

At least one of the problems indicated above has been solved according to a first embodiment of the invention directed to a method for selecting a connection for a mobile node arranged to operatively communicate with a network node arrangement via a plurality of connections.

The method comprises the steps of:
sending from the mobile node to the node arrangement a first registration request via a first connection of said connections, and a second registration request via a second connection of said connections,
sending from the node arrangement to the mobile node a first registration reply comprising routing cost for the first connection as a response to the first registration request, and a second registration reply comprising routing cost for the second connection as a response to the second registration request,
selecting in the mobile node the first connection or the second connection for up-link communication from the mobile node to the node arrangement depending on the routing cost for the first connection and the routing cost for the second connection.

According to the above registration requests and a registration replies are exchanged via two connections, whereby one connection of two is selected depending on the routing costs provided in the registration replies. Even though only two connections are mentioned it should be understood that this is the same regardless of the number of connections involved. In particular, even if there are several connections involved there will always be a final selection between two connections, e.g. the two connections being the best and the second best in a certain sense.

A second embodiment of the invention is directed to a method comprising the features of the first embodiment, which method comprises the steps of: sending from the node arrangement to the mobile node a first registration reply comprising routing cost for the first connection and a second registration reply comprising routing cost for the second connection, wherein at least one of said routing cost indicates that un-tunnelled communication should be used for the up-link communication from the mobile node to the node arrangement.

A third embodiment of the invention is directed to a method comprising the features of the second embodiment, which method comprises the additional steps of: using un-tunnelled communication for the up-link communication from the mobile node to the node arrangement via the connection on which the registration reply indicating no tunnelling was received.

A fourth embodiment of the invention is directed to a method comprising the features of the first embodiment, which method is characterized in that at least one of the routing costs comprises information about at least one of: the time delay; the transfer rate; the Quality of Service (QoS) or the Quality of Service Identifier (QIC) for the connection in question.

A fifth embodiment of the invention is directed to a method comprising the features of the first embodiment, which method is characterized in that at least one of the routing costs comprises information indicating that at least one of said first connection or said second connection is a point-to-point connection.

A sixth embodiment of the invention is directed to a method comprising the features of the second and fifth embodiments, which method is characterized in that un-tunnelled communication is used for the up-link communication from the mobile node to the node arrangement if the connection is a point-to-point connection.

In addition, at least one of the problems indicated above has been solved according to a seventh embodiment of the invention directed to a network node arrangement arranged to be operatively connected to a plurality of connections for communicating with at least one mobile node. The network node arrangement is characterized in that it is: arranged to operatively receive from the mobile node a first registration request via a first connection of said connections, and a second registration request via a second connection of said connections, and arranged to operatively send to the mobile node a first registration reply comprising routing cost for the first connection as a response to the first registration request, and a second registration reply comprising routing cost for the second connection as a response to the second registration request.

An eight embodiment of the invention is directed to a node arrangement comprising the features of the seventh embodiment, which node arrangement is characterized in that it is arranged to operatively send to the mobile node a first registration reply comprising routing cost for the first connection and a second registration reply comprising routing cost for the second connection, wherein at least one of said routing cost indicates to the mobile node that un-tunnelled communication should be used for the up-link communication from the mobile node to the node arrangement.

A ninth embodiment of the invention is directed to a node arrangement comprising the features of the eight embodiment, which node arrangement is characterized in that it is: arranged to operatively receive un-tunnelled communication in the up-link from the mobile node via the connection on which the registration reply indicating no tunnelling was received.

A tenth embodiment of the invention is directed to a node arrangement comprising the features of the seventh embodiment, which node arrangement is characterized in that it is arranged to operatively send to the mobile node routing cost for the first connection and routing cost for the second connection, wherein at least one the routing costs comprises information about at least one of: the time delay; the transfer rate; the Quality of Service (QoS) or the Quality of Service Identifier (QIC) for the connection in question.

An eleventh embodiment of the invention is directed to a node arrangement comprising the features of the seventh embodiment, which node arrangement is characterized in that it is arranged to operatively send to the mobile node routing cost for the first connection and routing cost for the second connection, wherein at least one the routing costs comprises information indicating that at least one of said first connection or said second connection is a point-to-point connection.

A twelfth embodiment of the invention is directed to a node arrangement comprising the features of the eight and eleventh embodiments, which node arrangement is characterized in that it is arranged to operatively receive un-tunnelled communication in the up-link from the mobile node if the connection is a point-to-point connection.

A thirteenth embodiment of the invention is directed to a node arrangement comprising the features of the seventh embodiment, which node arrangement is characterized in that it is arranged to be operatively implemented in a telecommunication network.

Furthermore, at least one of the problems indicated above has been solved according to a fourteenth embodiment of the invention directed to a mobile node provided with a plurality of interfaces and a control unit arrangement, which are arranged to operatively communicate with a network node arrangement via plurality of connections. The mobile node is characterized in that it is arranged to operatively send to the node arrangement a first registration request via a first connection of said connections, and a second registration request via a second connection of said connections, and arranged to operatively receive from the node arrangement a first registration reply comprising routing cost for the first connection as a response to the first registration request, and a second registration reply comprising routing cost for the second connection as a response to the second registration request, and arranged to select the first connection or the second connection for up-link communication from the mobile node to the node arrangement depending on the routing cost for the first connection and the routing cost for the second connection.

A fifteenth embodiment of the invention is directed to a mobile node comprising the features of the fourteenth embodiment, which mobile node is characterized in that it is arranged to operatively receive from the node arrangement a first registration reply comprising routing cost for the first connection and a second registration reply comprising routing cost for the second connection, wherein at least one of said routing cost indicates to the mobile node that un-tunnelled communication should be used for the up-link communication from the mobile node to the node arrangement.

A sixteenth embodiment of the invention is directed to a mobile node comprising the features of the fourteenth embodiment, which mobile node is characterized in that it is arranged to operatively use un-tunnelled communication in the up-link to the node arrangement via the connection on which the registration reply indicating no tunnelling was received.

A seventeenth embodiment of the invention is directed to a mobile node comprising the features of the fourteenth embodiment, which mobile node is characterized in that it is arranged to operatively receive from the node arrangement routing cost for the first connection and routing cost for the second connection, wherein at least one the routing costs comprises information about at least one of: the time delay; the transfer rate; the Quality of Service (QoS) or the Quality of Service Identifier (QIC) for the connection in question.

An eighteenth embodiment of the invention is directed to a mobile node comprising the features of the fourteenth embodiment, which mobile node is characterized in that it is arranged to operatively receive from the node arrangement routing cost for the first connection and routing cost for the second connection, wherein at least one of the routing costs comprises information indicating that at least one of said first connection or said second connection is a point-to-point connection.

A nineteenth embodiment of the invention is directed to a mobile node comprising the features of the fifteenth and eighteenth embodiments, which mobile node is characterized in that it is arranged to operatively use un-tunnelled communication in the up-link to the node arrangement if the connection is a point-to-point connection.

A twentieth embodiment of the invention is directed to a mobile node comprising the features of the fourteenth embodiment, which mobile node is characterized in that it is provided with a cell phone arrangement.

Further advantages of the present invention and embodiments thereof will appear from the following detailed description of embodiment the invention.

It should be emphasized that the term "comprises/comprising" or similar when used in this specification is taken to specify the presence of stated features, integers, steps or components or similar, but does not preclude the presence or addition of one or more other features, integers, steps, components or groups thereof or similar.

In addition, it should be emphasized that the term "node arrangement" when used in this specification is taken to specify the presence of one or several nodes.

It should also be emphasised that the steps or similar of the methods defined in the appended claims may, without departing from the present invention, be performed in another order than the order in which they appear in the claims.

DETAILED DESCRIPTION OF PREFERRED EMBODIMENTS

Figure 3:
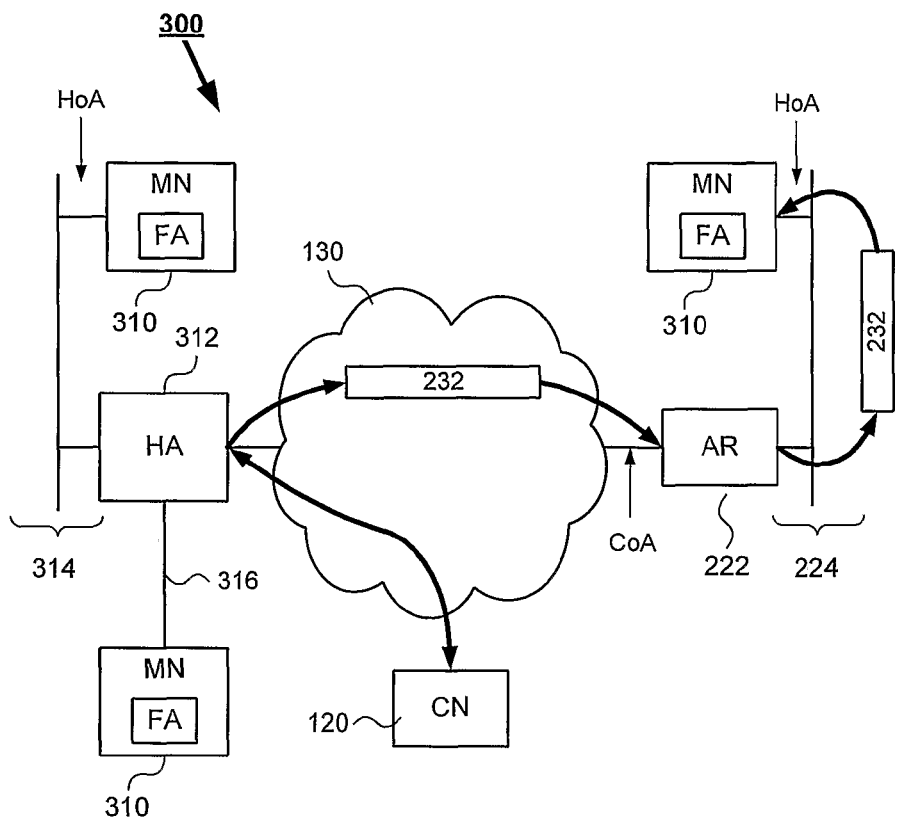
FIG. 3 is a schematic illustration of an exemplifying Mobile IP system 300 according to an embodiment of the present invention.

Structure of a Mobile IP-System According to a First Embodiment of the Invention FIG. 3 is a schematic illustration of an exemplifying Mobile IP system 300 according to an embodiment of the present invention. Amongst other things, the Mobile IP system 300 comprises a Mobile Node 310 (MN), a Home Agent 312 (HA), a home network 314, a Correspondent Node 120 (CN), an Access Router 222 (AR), a foreign network 224 and a communication network 130.

Figure 1:
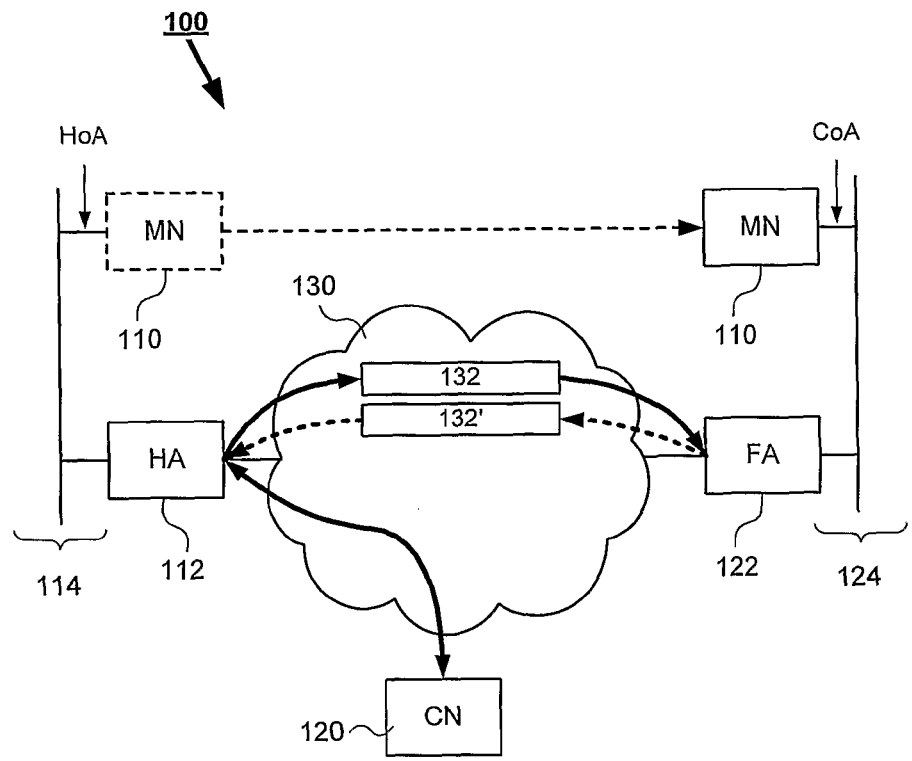
FIG. 1 is a schematic illustration an exemplifying and well known Mobile IP system 100.

The exemplifying Mobile IP system 300 is similar to the Mobile IP systems 100, 200 that were previously described with reference to FIGS. 1 and 2. Hence, the MN 310 may be a terminal, a host or a router or similar that changes its point of attachment from one network or sub-network to another without changing its IP-address with respect to nodes that may communicate with the MN 310.

The mobility provided for the MN 310 in the exemplifying Mobile IP system 300 is preferably based on the IETF specification RFC 3344 or its successor or similar, e.g. such as the updates in the IETF specification RFC 4721 and/or such as the further developments IETF specification RFC 3775.

It follows that the system 300 comprising MN 310, the HA 312, the home network 314, the CN 120, the AR 222, the foreign network 224 and the communication network 130 of the system 300 and various designs thereof are well known per se to those skilled in the art and there is no need for a detailed description of the ordinary features and functions of these nodes and networks etc. However, particular aspects related to embodiments of the present invention will be further discussed below.

As will be elaborated later it is preferred that the MN 310 can be connected to the HA 312 via each of the home network 314 and/or the foreign network 224 and/or via a point-to-point connection 316. In fact, it is preferred that the MN 310 can be connected to the HA 312 via these networks simultaneously, i.e. simultaneously connected to the HA 312 via the home network 314, the foreign network 224 and the point-to-point connection 316. This has been indicated in FIG. 3 by a MN 310 drawn with solid lines at the home network 314, at the foreign network 224 and at the point-to-point connection 316.

Hence, FIG. 3 shows a single MN 310 with the potential of being connected to the HA 312 via three different connections, i.e. the home network 314 connection, the foreign network 224 connection and the point-to-point connection 316. However, it should be observed that the MN 312 is arranged so that it may have access to the HA 312 via only one or two of the home network 314 or the foreign network 224 or the point-to-point connection 316, e.g. depending on whether the MN 310 is within range of the home network 314 and/or the foreign network 224 or whether the MN 310 is connected to the point-to-point connection 316.

Figure 2:
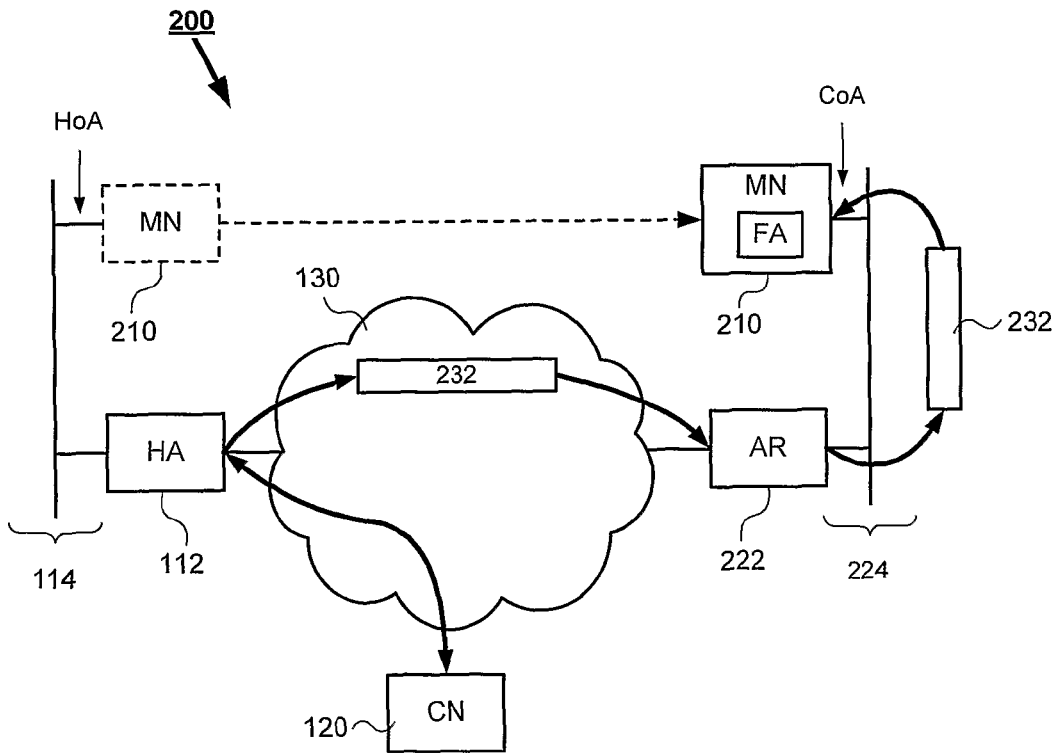
FIG. 2 is a schematic illustration of another exemplifying and well known Mobile IP system 200.

It is preferred that the MN 310 in the system 300 is a Mobile IP Node, e.g. as previously described for the MN 210 with reference to FIG. 2. Hence, the MN 310 is preferably based on the IETF specification RFC 3344 and/or its successor or similar, e.g. such as the updates in the IETF specification RFC 4721 and/or such as the further developments in the IETF specification RFC 3775. Hence, it is assumed that the MN 310 has the Mobile IP capability to signal its location to the Home Agent 312 so as to maintain a permanent IP-address with respect to the CN 120 and other nodes or similar that may communicate with the MN 310. To maintain a permanent IP-address it is preferred that the MN 310 is arranged to operatively register a Care-of-Address (CoA) or similar at the HA 312 or at an entity acting as the Home Agent (HA) for the MN 310. The CoA or similar may e.g. be registered in the same or similar manner as previously described with reference to FIG. 1 and/or FIG. 2.

It is also preferred that that the MN 310 comprises a more or less permanent Home Address (HoA) that is valid at the home network 314, even though the MN 310 moves between the home network 314 and the foreign network 224 or similar, or moves between other networks, e.g. such as between the foreign network 224 and another foreign network or similar. Alternatively, the HoA may be an identifier that enables the HA 312 to identify the MN 310. In the same manner, it is also preferred that the MN 110 comprises the IP-address of its HA 312 (HA IP).

Figure 4:
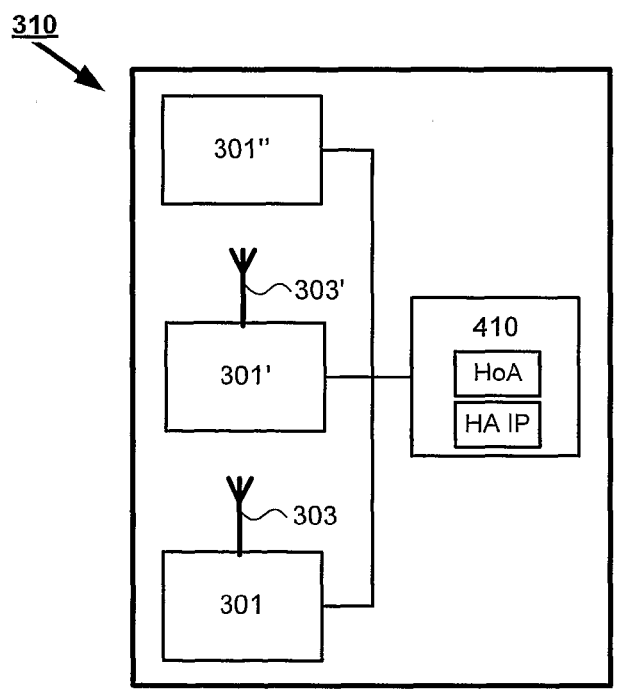
FIG. 4 is a schematic illustration of the relevant parts of the exemplifying Mobile IP Node 310.

Interior details of the exemplifying MN 310 are shown in FIG. 4 providing a schematic illustration of parts of the Mobile IP Node 310. It is preferred that the MN 310 in FIG. 4 is provided with a first radio circuit 301 and a first antenna 303 connected to each other for enabling radio communication with the home network 314 and the HA 312 connected thereto. It is further preferred that that the first radio circuit 301 is a WiMAX radio or similar regional radio and that the home network 314 is a regional WiMAX network or similar, e.g. based on the IEEE 802.16 standard or similar. Hence, following the exemplifying system 300 in FIG. 3 it is preferred that the MN 310 is arranged to operatively communicate with the home network 314 via a WiMAX-based access, i.e. via a WiMAX based interface. Further, as can be seen in FIG. 4, it is preferred that the radio circuit 301 is connected to a control unit 410 arranged in the MN 310 for controlling and supervising the general operation of the WiMAX parts or similar of the MN 310. The control unit 410 may be implemented by means of hardware and/or software and it may comprise one or several hardware units and/or software modules, e.g. one or several processor units provided with or having access to the appropriate software and hardware required by the functions of the MN 310. The features and functions of a WiMAX based terminal such as the MN 310 and a WiMAX-based network such as the home network 314 are well known to those skilled in the art of WiMAX technology, e.g. based on the IEEE 802.16 and no further description is needed.

Moreover, it is preferred that the MN 310 in FIG. 4 is provided with a second radio circuit 301' and a second antenna 303' connected to each other for enabling radio communication with the foreign network 224 and the AR 222 connected thereto. It is further preferred that the second radio circuit 301' is a WiFi radio or similar local radio and that the foreign network 224 is a local WiFi network or similar, e.g. based on the IEEE 802.11 standard or similar. Hence, following the exemplifying system 300 in FIG. 3 it is preferred that the MN 310 is arranged to operatively communicate with the foreign network 224 via a WiFi-based access, i.e. via a WiFi-based interface. Further, as can be seen in FIG. 4, it is preferred that the radio circuit 301' is connected to the control unit 410 arranged within the MN 310 for controlling and supervising the general operation of the WiFi parts or similar of the MN 310. As already indicated above, the control unit 410 may be implemented by means of hardware and/or software and it may comprise one or several hardware units and/or software modules, e.g. one or several processor units provided with or having access to the appropriate software and hardware required by the functions of the MN 310. The features and functions of a WiFi based terminal such as the MN 310 and a WiFi-based network such as the foreign network 224 are well known to those skilled in the art of WiFi technology, e.g. based on the IEEE 802.11 and no further description is needed.

In addition, it is preferred that the MN 310 is provided with a third communication circuit 301" that is similar to the first and the second communication circuits 301, 301'. However, it is preferred that the third communication circuit 301" is an interface arrangement for a wired connection such as a wired Ethernet. The Ethernet technology is well known to those skilled in the art and it is e.g. described the IEEE 802.3 standard. In particular it is preferred that the communication circuit 301" is an interface arrangement for a wired point-to-point connection, e.g. an interface for the point-to-point connection 316 as will be described in more detail later.

The attention is now directed to the Access Router 222 (AR) of the system 300. It is preferred that the foreign network 224 comprises an AR 222 in the same or similar manner as previously described with reference to FIG. 2. Hence, it is preferred that the AR 222 is a node or node arrangement or similar entity in the foreign network 224 that provides access to the foreign network 224 for mobile nodes such as the MN 310 and similar. The AR 222 may e.g. be an access point, a base station, an access gateway or a similar node or node arrangement providing access to the network 224.

Before we proceed it should be added that the CN 120 may be any suitable node that is arranged to communicate with the HA 712 via the communication network 130. For example, the CN 120 may be a terminal, a host or a router or similar and it may even be a peer or similar with which the MN 710 is communicating. The CN 120 may be mobile or stationary.

Now, the HA 312 of the exemplifying Mobile IP system 300 in FIG. 3 will be described in more detail. The HA 312 is similar to the HA 112 as previously described with reference to FIG. 1. Hence, it is preferred that the HA 312 is a router or similar arranged in a node or node arrangement being connected to the home network 314 of the MN 310, to the foreign network 224 and to a point-to-point connection 316 as will be further elaborated below.

As is well known to those skilled in the art, a router is a computer or similar whose software and hardware are tailored for the tasks of routing, i.e. tailored for the process of selecting paths in a network or combination of networks along which to send a data packet or similar.

The HA 312 may itself be connected to the home network 314, or it may be located (fully or partly) in a node or in a node arrangement that in turn is connected to the home network 314. The connection between the HA 312 and the MN 310 via the home network 314 may be a point-to-point connection or it may be a tunneled connection.

It is also preferred that the HA 312 serves as the Mobile IP anchor point or similar for communication with the MN 310, e.g. according to the IETF specification RFC 3344 and/or its updates or successor or similar, e.g. such as the updates in the IETF specification RFC 4721 and/or such as the further developments in the IETF specification RFC 3775.

In particularly, it is preferred that the HA 312 is arranged to operatively register a CoA or similar for the MN 310 so as to establish a tunnel 232 or a similar connection for delivering data packets or similar to the MN 310 when the MN 310 is located at the foreign network 224. Hence, in the exemplifying system 300 shown in FIG. 3 the HA 312 may tunnel packets received from the CN 120 to the MN 310 (e.g. to the FA or similar co-located in the MN 310) via a tunnel 232 established between the HA 312 and the MN 310. This is the same or similar as previously describe with reference to MN 210 and tunnel 232 in FIG. 2.

Likewise, since the HA 312 has the general Mobile IP ability to register a CoA for the MN 310 it follows that the HA 312 can—e.g. as a response to a registration request from the MN 310—register a CoA or similar for the MN 310 so as to establish a tunnel for delivering data packets or similar to the MN 310 when the MN 310 is located at the home network 314. However, this rather untypical alternative has not been illustrated in FIG. 3.

The set-up of the home network 314 and the HA 312, and the set-up of the foreign network 224, the AR 222 and the HA 312 described above with reference to FIG. 3 is substantially the same as the set-up of the home network 114 and the HA 112, and the set-up of the foreign network 224, the AR 222 and the HA 112 previously described with reference to FIG. 2.

In FIG. 3 the exemplifying HA 312 has been provided with an additional point-to-point connection 316 that is arranged to provide an access for the MN 310 to the HA 312, i.e. the point-to-point connection 316 is arranged so that the MN 310 and the HA 312 can connect and communicate with each other via the connection 316. It is preferred that the point-to-point connection 316 is an Ethernet connection or similar. For example, the connection 316 can be accomplished by physically connecting an Ethernet cable or similar from the MN 310 to the HA 312 or to a node or node arrangement to which the HA 312 is connected or in which the HA 312 is located (fully or partly). The protocol used to communicate over the point-to-point connection 316 may e.g. be a so-called Point-to-Point Protocol (PPP) which can be used to establish a direct connection between the HA 312 and the MN 310. The PPP and similar are well known to those skilled in the art and one version is e.g. described in the IETF specification RFC 1661.

The HA 312 can determine whether to use tunnelling or not in the down-link. This can e.g. be accomplished by verifying whether a care-of-address (CoA) has been allocated in a home list or similar of the HA 312, e.g. as a result of an initial registration request from the MN 310. It is preferred that no down-link tunnelling is used when no CoA has been allocated. In addition or alternatively, down-link tunnelling should preferably not be used if no CoA is provided in the initial registration request from the MN 310 or if there is other information indicating that tunnelling should not be used, is not expected or is not supported etc in the down-link. For example, down-link tunnelling typically requires that the D' bit or a similar decapsulation flag is set in the initial registration request from the MN 310. Hence, tunnelling should preferably not be used if the D' bit is not set. As is well known to those skilled in the art, by setting the D' bit the MN 310 announces that itself (or e.g. a FA co-located with the MN 310) will decapsulate packets or similar received from the HA 312 using the CoA. The D' bit is e.g. described in the IETF specification RFC 3344 and similar.

Alternatively or additionally, the HA 312 can determine whether to use tunnelling or not in the down-link by possessing knowledge about the properties of the specific link or similar connection on which the MN 310 accesses the HA 312. This is particularly so in case of a point-to-point connection or similar, e.g. such as the point-to-point connection 316 described above. Since IP packets or similar sent from the HA 312 to the MN 310 via the point-to-point connection 316 reach the MN 310 regardless of the IP-address used by the HA 312 it follows that the HA 312 does not have to tunnel IP packets or similar to the MN 310 when the MN 310 is connected to the HA 312 via a point-to-point connection.

Whether the link in question is a point-to-point connection can be determined in several ways. For example, the HA 312 and/or the node or node arrangement in which the HA 312 is located or to which the HA 312 is connected may be provided with information revealing whether a specific link or similar is a point-to-point connection. In addition or alternatively, the HA 312 may safely assume that it is a point-to-point connection if the MN 310 is registering directly with the HA 312 via the connection in question.

Then, if the HA 312 is to transmit packets to the MN 310 via a link or similar that it knows is a point-to-point connection it can decide to send the packets to the MN 310 without using a down-link tunnel, e.g. without encapsulating the packets by means of a CoA or similar. This may be so even if the MN 310 in its initial registration request provided a CoA or similar and/or even if a CoA or similar should have been allocated in a home list or similar of the HA 312 and/or if the D' bit or similar decapsulation bit was set in the initial registration request from the MN 310.

On the up-link the MN 310 may ask the HA 312 to support reverse tunnelling, which e.g. may be done to reduce the risk for spoofing etc as previously discussed with reference to FIG. 1 and the reverse tunnel 132'. However, it is difficult to use the MN 310 for deciding whether to use reverse tunnelling or not in a specific network. Hence, by always asking the HA 312 to support reverse tunnelling when possible the MN 310 is "safe", but the overhead over the link might be unnecessary high.

To this end it is preferred that the HA 312 is arranged to send a registration reply or similar to the MN 310, which reply defines whether the connection used by the MN 310 requires tunnelling or not for up-link traffic from the MN 310 to the HA 312. This is a decision that the HA 312 can take based on the same or similar principles as it took the decision in the down-link direction. In other words, up-link tunnelling should preferably not be used when no CoA is provided in the initial registration request from the MN 310, or if a CoA has not been allocated by the HA 312, or if the registration request from the MN 310 otherwise indicates that tunnelling should not be used, is not expected or is not supported etc in the up-link. For example, the use of up-link tunnelling typically requires that the T' bit or a similar encapsulation flag is set in the initial registration request from the MN 310. Hence, up-link tunnelling should preferably not be used if the T' bit is not set. The T' bit is e.g. described in the IETF specification RFC 3024 and similar.

To summarize, the HA 312 can decide to refrain from applying tunnelling in the in down-link if the connection between the MN 310 and the HA 312 is a point-to-point connection or similar. When the HA 312 refrains from using a tunnel in the down-link the HA 312 may send a registration reply or similar to the MN 310, which reply defines that no tunnelling will be used for the down-link traffic. As a consequence, it is preferred that the MN 310 (and/or a FA co-located in the MN 310) refrains from decapsulation of packets received from the HA 312 via the point-to-point connection 316.

The IP-address used by the HA 312 in the packets sent to the MN 310 via the point-to-point connection 316 may be arbitrary, since the packets will always reach the MN 310. However, it is preferred that the HA 312 is set-up in manner so that it uses an address that the MN 310 will accept and process so that the information sent to the MN 310 is readily received. The set-up of the addresses to be used by the HA 312 can e.g. be done by the network operator, especially in case all the networks and/or connections 224, 314, 316 are controlled by the same operator.

To summarize further, if the HA 312 is to receive up-link packets from the MN 310 via a link or similar that it knows is a point-to-point connection it can decide to send a registration reply to the MN 310, which reply defines that connection used by the MN 310 requires no tunnelling for up-link traffic to the HA 312. As a consequence, it is preferred that the MN 310 (and/or a FA co-located in the MN 310) refrains from using a reverse tunnel for the up-link traffic on the point-to-point connection 316, e.g. refrains from encapsulating packets sent to the HA 312 via the connection 316.

Hence, by avoiding tunnelling it follows that the most favourable routing alternative is selected when both tunnelling and no-tunnelling can be used simultaneously or alternatively on the same connection, which usually is the case with a point-to-point connection. In fact, by avoiding tunnelling the routing alternative providing the lowest routing cost has been selected and a routing optimization has been accomplished.

The routing optimization can be further improved if the registration reply or similar sent from the HA 312 to the MN 310 comprises further information about the connection used by the MN 310. For example, in addition or as an alternative to whether the connection requires tunnelling or not for up-link traffic from the HA 312 can be arranged to send a registration reply or similar to the MN 310 comprising more detailed and/or more versatile information about the routing cost or similar associated with the connection in question.

For example, the routing cost may be defined by indicating at the time delay for sending a packet or similar from the MN 310 to the HA 312 and/or the CN 120 via the connection in question. Similarly, the routing cost may e.g. be defined by additionally or alternatively indicating at the data transfer rate or similar provided by the connection in question. Additionally and/or alternatively the routing cost may e.g. be defined by indicating at least one of the Quality of Service (QoS) and/or the QoS Class Identifier (QCI) or similar provided by the connection in question, e.g. as defined within the framework of the 3GPP (conversational, streaming, interactive, background).

Now, assume that the MN 310 is simultaneously connected to the HA 312 via at least two of:
the foreign network 224 and the tunnel 232,
the home network 314, and/or
the point-to-point connection 316

Using the information about the connections 224, 314, 316 provided in the registration replies or similar sent from the HA 312 as described above it will be possible for the MN 310 to select a connection 224, 314, 316 for up-link communication to the HA 312 depending on the routing cost for the connection 224, 314, 316 in question. Preferably, the connection providing the most suitable routing cost is selected, e.g. the connection 224, 314, 316 providing the shortest time delay, the highest data rate, the best QoS and/or the best QIC etc.

Function of a Mobile IP System According to an Embodiment of the Invention

Figure 5:
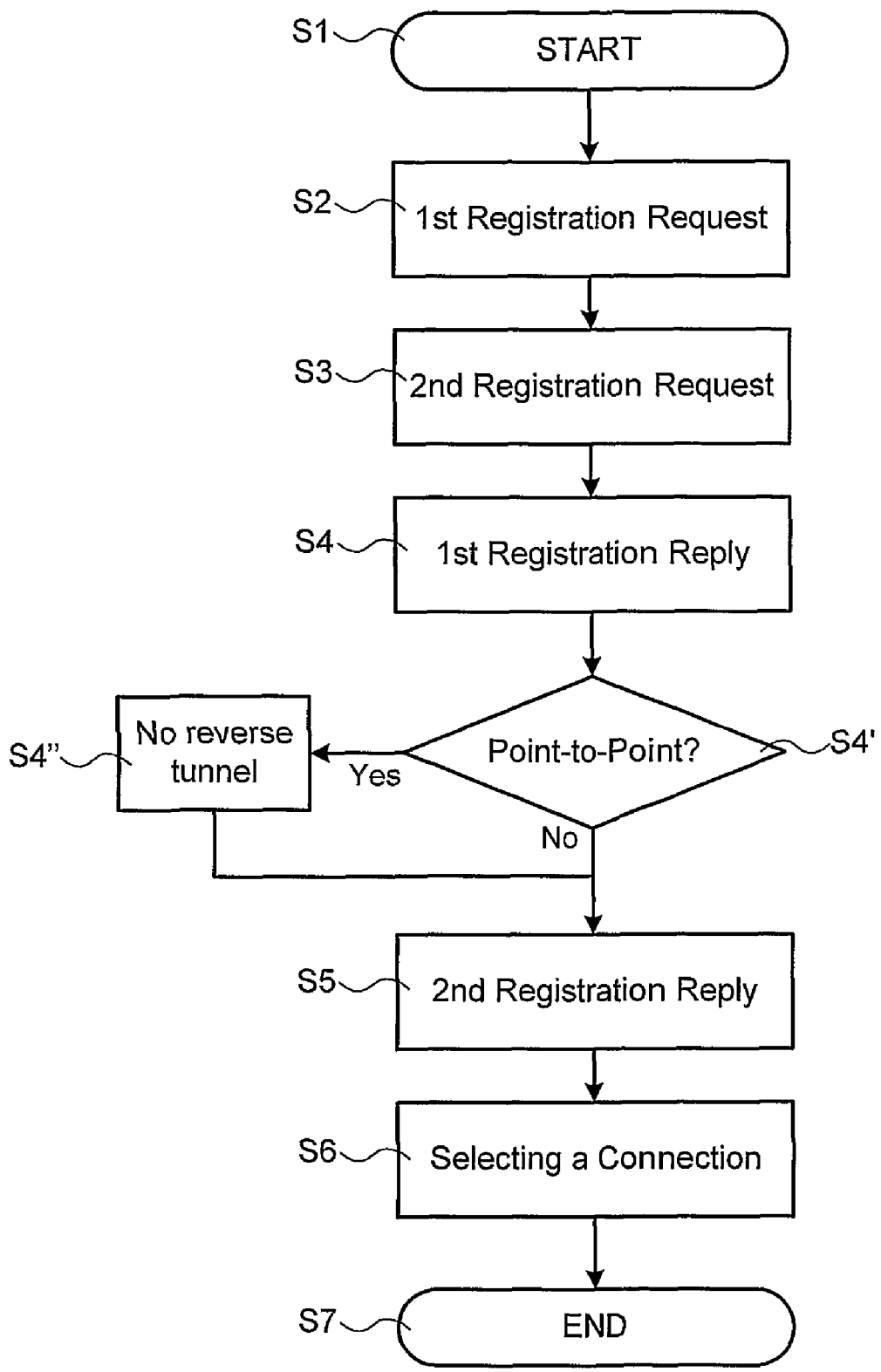
FIG. 5 is a flowchart illustrating the operational steps of an embodiment of the present invention.

Functions of the exemplifying Mobile IP system 300 will now be described with reference to FIG. 5 showing a flowchart illustrating the operational steps of a method according to an exemplifying embodiment of the present invention.

In a first step S1 it is preferred that the exemplifying Mobile IP system 300 is activated so as to be operative. It is also preferred that the MN 310 has access to the HA 312 via the point-to-point connection 316, and that the MN 310 is within range of at least one of the home network 314 and/or the foreign network 224.

In a second step S2 it is preferred that the MN 310 sends a first registration request or similar to the HA 312 via the point-to-point connection 316, e.g. using the Ethernet-interface 301" as previously described.

In a third step S3 it is preferred that the MN 310 sends a second registration request or similar to the HA 312 via the home network 314 or the foreign network 224 using the WiMAX-interface 301 or the WiFi-interface 301' respectively as previously described.

In a fourth step S4 it is preferred that the HA 312 sends a first registration reply or similar to the MN 310 as a response to the first registration request sent in step S2. The first registration reply comprises the routing cost or similar associated with the point-to-point connection 316. In this case the routing cost may simply comprise the information that the connection is a point-to-point connection indicating that the connection is more efficient (e.g. faster) than other connections that may be available to the MN 310 for communication with the HA 312 by means of tunnelling. However, the first registration reply may comprise other and/or alternative routing costs as indicated above.

A specific embodiment comprises a further step S4' wherein it is preferred that the MN 310 is arranged to analyze whether the connection in question is a point-to-point connection and if the connection is a point-to-point connection it is preferred that the MN 310 is arranged to execute an additional step S4" by refraining from applying a reverse tunnel for the up-link communication to the HA 312. The method will then proceed to the fifth step S5 as will be described below. However, if there is no indication of a point-to-point connection it is preferred that the MN 310 in this specific embodiment proceeds directly to the fifth step S5.

In a fifth step S5 it is preferred that the HA 312 sends a second registration reply or similar to the MN 310 as a response to the second registration request sent in step S3. The second registration reply comprises the routing cost or similar associated with the connection via the home network 314 or the foreign network 224 depending on the network 224, 314 used by the MN 310 for registering at the HA 312.

In a sixth step S6 it is preferred that the MN 310 selects a connection among the available connections 316 and 224 or 314 as may be the case for the up-link communication to the HA 312. As previously described, the selection depends on the routing cost for the connection 316 and the connection 224 or 314.

In a seventh step S7 it is preferred that the method is ended. However, this should not be understood so as to limiting the exemplifying method to a single performance of the steps therein. On the contrary, the method may be repeated many times, e.g. each time a new registration request is sent by the MN 310, which e.g. may be the case if the MN 310 comes within range of yet another network, e.g. the home network 314 or the foreign network 224 that it was not previously registered on.

Figure 6:
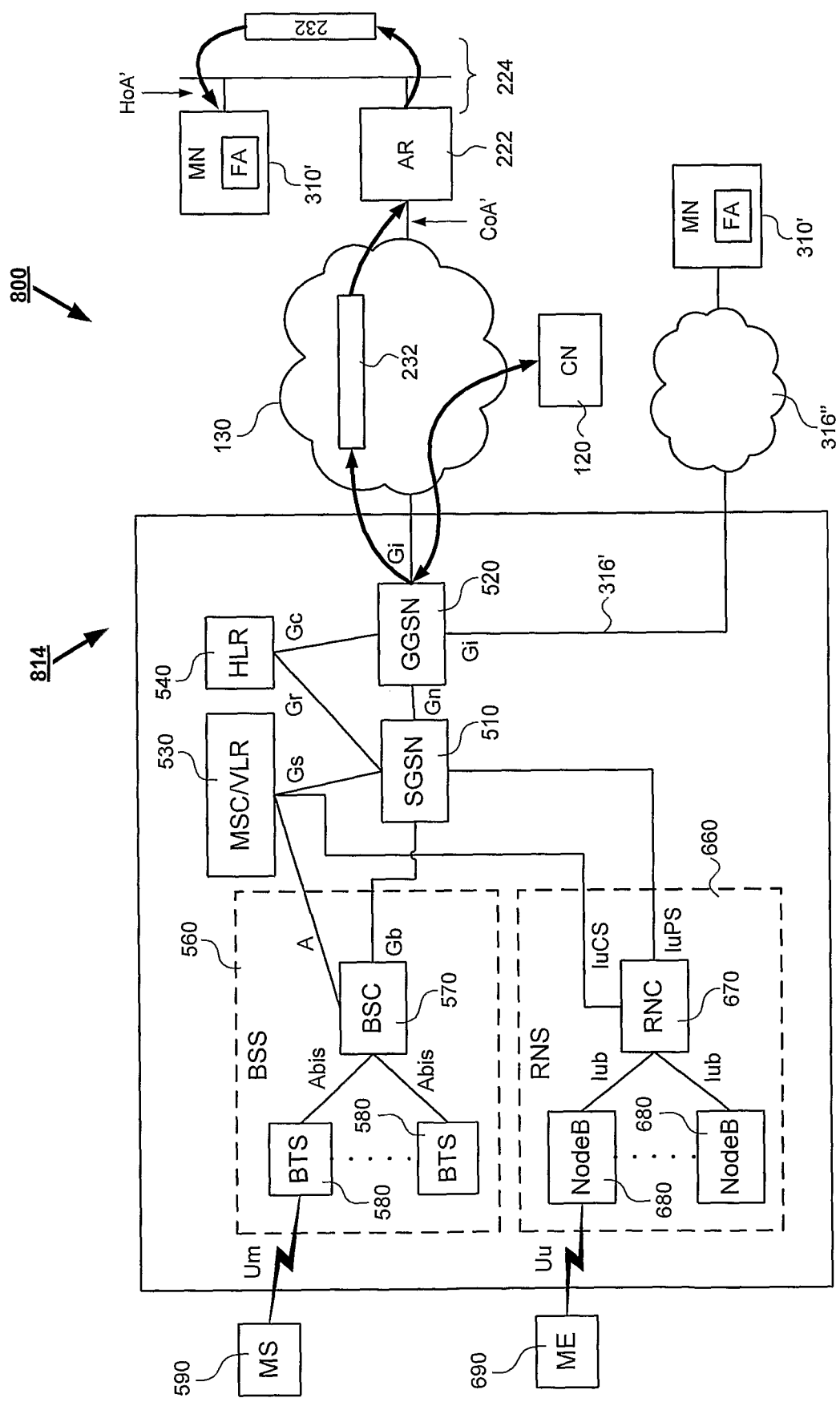
FIG. 6 is a schematic illustration of another exemplifying proxy Mobile IP system 800 based on the Mobile IP system 300 in FIG. 300 but with another home network 814 and another point-to-point connection 316', 316".

Structure of a Mobile IP-System According to a Second Embodiment of the Invention The attention is now directed to a second exemplifying Mobile IP system 800 according to an embodiment of the invention as illustrated in FIG. 6. The system 800 is the same as previously discussed with reference to FIG. 3. However, the WiFi-based home network 314 in has been replaced by an exemplifying telecommunication network 814 in the form of a General Packet Radio Service system (GPRS system) comprising various network elements and interfaces as shown in FIG. 6.

The structure and operation of a general GPRS system is well known to those skilled in the art and it needs no detailed explanation. Information about GPRS systems and similar systems as the UMTS can e.g. be found in the specifications released by the 3rd Generation Partnership Project (3GPP), se e.g. www.3gpp.org. Nevertheless, a brief overview of an exemplifying GPRS network is given below. Before we proceed it should be emphasized that the home network 814 is by no way limited to a GPRS network or similar. On the contrary, the invention can be implemented in connection with most telecommunication systems of today, e.g. such as GSM, EDGE, CDMA, WCDMA and the HSDPA and similar including successors to such systems.

The main Core Network (CN) elements in the GPRS network 800 are the Serving GPRS Support Node (SGSN) 510, the Gateway GPRS Support Node (GGSN) 520, and upgraded location registers such as the Visitor Location Register (VLR) 530 and the Home Location Register (HLR) 540. The SGSN 510 and the GGSN 520 may be connected directly and/or through intermediate routers and switches to form parts of the CN. In addition, it should be emphasized that a SGSN 510 and a GSGSN 520 may be fully or partly arranged in the same physical unit and/or as spatially separated equipments, e.g. equipments arranged at different geographical locations. The CN is used as the interface between a Radio Access Network (RAN)—as will be elaborated below—and various external data networks such as e.g. a Public Data Network (PDN). Here, as shown in FIG. 6, a PDN is the communication network 130. As previously described, the communication network 130 may e.g. be the Internet or similar. Moreover, as shown in FIG. 6 another PDN or similar provides a point-to-point connection 316' between the GGSN 520 and the MN 310' via an Ethernet network 316" in the same or similar manner as previously described for the point-to-point connection 316.

The GGSN 520 operates as an interface between the CN and the various PDNs through the GPRS Gi-interface. At the other end the SGSN 510 operates as an interface between various RANs.

If the RAN is a GSM EDGE Radio Access Network (GERAN) the SGSN 510 interfaces through the GPRS Gb-interface. Typically, the GERAN comprises one or several Base station Sub-Systems (BSS) 560, which in turn comprises one or several Base Station Controllers (BSC) 570 at one end being connected to the SGSN 510 via said Gb-interface, and at the other end connected to a plurality of Base Transmission Stations (BTS) 580 via a GPRS Abis-interface. A BTS 580 is in turn serving one or several Mobile Stations (MS) 590 via a GPRS Urn-interface, which is an air interface.

In addition, if the RAN is a Universal Terrestrial Radio Access Network (UTRAN) the SGSN 510 interfaces through the GPRS IuPS-interface. Typically, the UTRAN comprises one or several Radio Network Systems (RNS) 660, which in turn comprises one or several Radio Network Controllers (RNC) 670 at one end being connected to the SGSN 510 via said IuPS-interface, and at the other end connected to a plurality of NodeBs 680 via a GPRS Iub-interface. Each NodeB is in turn serving one or several Mobile Equipments (ME) 690 via a GPRS Uu-interface, which is an air interface.

The SGSN 510 maintains signaling connections with the HLR 540 and a Mobile Switching Centre (MSC) and the VLR 530 through the GPRS Gs-interface and the GPRS Gr-interface respectively. The GGSN 520 maintains signaling connections with the HLR 540 through the GPRS Gc-interface. A BSC 570 maintains signaling with the MSC/VLR 530 through the GPRS A-interface, whereas a RNC maintains signaling with the MSC/VLR 530 through the GPRS IuCS-interface. The interconnection between the SGSN 510 and GGSN 520 are implemented through the GPRS Gn-interface.

The CN in GPRS can e.g. use the Internet Protocol (IP) as the protocol in the network layer. The protocols used in the transport layer can e.g. be the Internet User Datagram Protocol (UDP) for IP services and the Internet Transmission Control Protocol (TCP) for services which require delivery guarantee such as X.25 services.

The above description of the exemplifying GPRS network 814 corresponds in general to the 3GPP standard and particularly to the specifications in the 3GPP 28-series and 48-series regarding Signal Protocols RSS-CN.

As can be seen in FIG. 6 the exemplifying Mobile IP system 800 is preferably provided with the same or at least similar AR/MPA 222 as previously described with reference to FIG. 3. However, regarding the previously discussed HA 312 it is preferred that the functions of the HA 312 are now preformed by the GGSN 520 in the GPRS network 814 or a node arrangement in the network 814 comprising the GGSN 520. For example, some functions of the previously discussed HA 312 may be performed by the GGSN 520 whereas other functions may be performed by other nodes in the network 814, which nodes are arranged to operatively communicate with the GGSN 520. In addition, the GGSN 520 may itself be distributed over several nodes in the network 814.

The MN 310' in the Mobile IP system 800 is preferably provided with the Mobile IP capability to signal its location to a Home Agent in the same or similar manner as previously described with reference to the MN 310 in FIG. 3. It is also preferred that the MN 310' in the Mobile IP system 800 is provided with the ability to access the GPRS network 814 and the communication network 130 in the same or similar manner as an ME 690, i.e. the MN 310' is provided with the functions and arrangements of a cell phone. To this end the WiMAX radio circuit 301 and antenna 303 may be replaced by the corresponding functionality of the radio circuit and antenna of an ME 690 and the control unit 410 may be correspondingly adapted to control the alternative radio circuit and antenna of an ME 690. Hence, in this embodiment it is preferred that the control unit 410 and the interfaces of the MN 310' support communication with all the networks 224, 314 and 814. An MN 310' that supports communication with all the networks 224, 314, 814 is well known per se to those skilled in the art and it needs no further description.

The present invention has now been described with reference to exemplifying embodiments. However, the invention is not limited to the embodiments described herein. On the contrary, the full extent of the invention is only determined by the scope of the appended claims.

The invention claimed is:

1. A method for selecting a connection for a mobile node configured to communicate with a Home Agent (HA) via a plurality of connections, the method comprises the steps of:
   sending from the mobile node to the HA a first registration request via a first connection of said connections, and a second registration request via a second connection of said connections;
   sending from the HA to the mobile node a first registration reply comprising routing cost for the first connection as a response to the first registration request, and a second registration reply comprising routing cost for the second connection as a response to the second registration request, wherein the first registration reply is sent via the first connection and the second registration reply is sent via the second connection, and wherein at least one of said routing costs indicates to the mobile node to use an un-tunnelled communication for an up-link communication from the mobile node to the HA; and based on the received routine costs, the mobile node selecting the first connection or the second connection so as to avoid tunnelling for the up-link communication from the mobile node to the HA.

2. The method according to claim 1, further comprising the step of:
using said un-tunnelled communication for the up-link communication from the mobile node to the HA via the selected first connection or the second connection on which the registration reply indicating no tunnelling was received.

3. The method according to claim 1, wherein at least one of the routing costs comprises information indicating that at least one of said first connection and said second connection is a point-to-point connection.

4. The method according to claim 1, wherein said un-tunnelled communication is used for the up-link communication from the mobile node to the HA when the mobile node-selected connection is a point-to-point connection.

5. A Home Agent (HA) operatively connected to a plurality of connections for communicating with a mobile node, wherein said HA is configured to perform the following:
receive from the mobile node a first registration request via a first connection of said connections, and a second registration request via a second connection of said connections; and
send to the mobile node a first registration reply comprising routing cost for the first connection as a response to the first registration request, and a second registration reply comprising routing cost for the second connection as a response to the second registration request, wherein the first registration reply is sent via the first connection and the second registration reply is sent via the second connection, and wherein at least one of said routing costs indicates to the mobile node to use an un-tunnelled communication for an up-link communication from the mobile node to the HA, thereby enabling the mobile node to select one of the first and the second connections to avoid tunneling for the up-link communication from the mobile node to the HA.

6. The HA according to claim 5, wherein said HA is further configured to perform the following:
receive said un-tunnelled communication in the up-link from the mobile node via one of the first and the second connections on which the registration reply indicating no tunnelling was sent.

7. The HA according to claim 5,
wherein at least one of the routing costs comprises information indicating that at least one of said first connection and said second connection is a point-to-point connection.

8. The HA according to claim 5, wherein said HA is further configured to perform the following:
receive said un-tunnelled communication in the up-link from the mobile node when the mobile node-selected connection is a point-to-point connection.

9. The HA according to claim 5, wherein said HA is implemented in a telecommunication network.

10. A mobile node provided with a plurality of interfaces and a control unit to operatively communicate with a Home Agent (HA) via a plurality of connections, wherein said mobile node is configured to perform the following:
send to the HA a first registration request via a first connection of said connections, and a second registration request via a second connection of said connections;
receive from the HA a first registration reply comprising routing cost for the first connection as a response to the first registration request, and a second registration reply comprising routing cost for the second connection as a response to the second registration request, wherein the first registration reply is received via the first connection and the second registration reply is received via the second connection, and wherein at least one of said routing costs indicates to the mobile node to use an un-tunnelled communication for an up-link communication from the mobile node to the HA; and
based on the received routing costs, select the first connection or the second connection for the up-link communication from the mobile node to the HA depending on which of the first and the second connections has lower routing cost and also to avoid tunneling for the up-link communication.

11. The mobile node according to claim 10, wherein said mobile node is further configured to use said un-tunnelled communication in the up-link to the HA via the selected first connection or the second connection on which the registration reply indicating no tunnelling was received.

12. The mobile node according to claim 10, wherein at least one of the routing costs comprises information indicating that at least one of said first connection and said second connection is a point-to-point connection.

13. The mobile node according to claim 10, wherein said mobile node is further configured to use said un-tunnelled communication in the up-link to the HA when the mobile node-selected connection is a point-to-point connection.

14. The mobile node according to claim 10, wherein said mobile node is a cell phone.

* * * * *

UNITED STATES PATENT AND TRADEMARK OFFICE
CERTIFICATE OF CORRECTION

PATENT NO. : 8,363,600 B2  
APPLICATION NO. : 12/810563  
DATED : January 29, 2013  
INVENTOR(S) : Backman Page 1 of 1

It is certified that error appears in the above-identified patent and that said Letters Patent is hereby corrected as shown below:

In the Specification:

In Column 2, Line 2, delete "network 112" and insert -- network 114 --, therefor.

In Column 4, Line 27, delete "FIG. 2" and insert -- FIG. 2. --, therefor.

In Column 10, Line 49, delete "MN 312" and insert -- MN 310 --, therefor.

In Column 14, Line 46, delete "the in" and insert -- the --, therefor.

In Column 15, Line 43, delete "connection 316" and insert -- connection 316. --, therefor.

In Column 17, Lines 10-11, delete "GPRS network 800" and insert -- GPRS network 814 --, therefor.

In Column 17, Line 18, delete "GSGSN 520" and insert -- GGSN 520 --, therefor.

In the Claims:

In Column 19, Line 1, in Claim 1, delete "routine" and insert -- routing --, therefor.

Signed and Sealed this  
Ninth Day of April, 2013

Teresa Stanek Rea  
*Acting Director of the United States Patent and Trademark Office*